United States Patent [19]
Cahill, III

[11] Patent Number: 5,812,207
[45] Date of Patent: Sep. 22, 1998

[54] METHOD AND APPARATUS FOR SUPPORTING VARIABLE OVERSAMPLING RATIOS WHEN DECODING VERTICAL BLANKING INTERVAL DATA

[75] Inventor: Benjamin M. Cahill, III, Ringoes, N.J.

[73] Assignee: Intel Corporation, Santa Clara, Calif.

[21] Appl. No.: 771,228

[22] Filed: Dec. 20, 1996

[51] Int. Cl.$^6$ ...................................................... H04N 7/08
[52] U.S. Cl. ............................................ 348/465; 348/478
[58] Field of Search ...................................... 348/465, 468, 348/473, 476, 478, 572; H04N 7/087

[56] References Cited

U.S. PATENT DOCUMENTS

| | | |
|---|---|---|
| 4,774,715 | 9/1988 | Messenger . |
| 5,089,892 | 2/1992 | Koguchi et al. . |
| 5,293,234 | 3/1994 | Ko . |
| 5,311,312 | 5/1994 | Oh . |
| 5,486,865 | 1/1996 | James ........................................ 348/465 |
| 5,521,645 | 5/1996 | Ezaki ........................................ 348/465 |
| 5,552,726 | 9/1996 | Wichman et al. . |
| 5,555,024 | 9/1996 | Limberg ................................... 348/473 |
| 5,565,930 | 10/1996 | Bolger et al. ............................ 348/572 |
| 5,590,154 | 12/1996 | Forni et al. . |
| 5,657,088 | 8/1997 | Hankinson ............................... 348/465 |

OTHER PUBLICATIONS

PCT International Search Report for International Application No. PCT/US97/09759, dated Sep. 04, 1997, 1 page.
PCT International Search Report for International Application No. PCT/US97/10360 (Docket No. 42390.P3734), dated Oct. 09, 1997, 1 page.
PCT International Search Report for International Application No. PCT/US97/10362 (Docket No. 42390.P3733), dated Oct. 17, 1997, 1 page.
Joint EIA/CVCC Recommended Practice for Teletext: North American Basic Teletext Specification (NABTS), EIA Standard: EIA–516, May 1988, pp.: Cover, Preface, i–vi, 1–5, and 62–65.
"Recommended Practice for Line 21 Data Service", EIA Standard: EIA–608, Sep. 1994, pp.: Cover, i–iv, and 7–9.

*Primary Examiner*—Victor R. Kostak
*Attorney, Agent, or Firm*—Blakely, Sokoloff, Taylor & Zafman

[57] ABSTRACT

A method and apparatus for supporting variable oversampling ratios when decoding vertical blanking interval data receives an indication of an oversampling ratio being used to sample a signal received during the vertical blanking interval. The sampled signal is also received. Then, based on the indication of the oversampling ratio being used, the data embedded in the vertical blanking interval is identified.

18 Claims, 10 Drawing Sheets

METHOD AND APPARATUS FOR SUPPORTING VARIABLE OVERSAMPLING RATIOS WHEN DECODING VERTICAL BLANKING INTERVAL DATA

BACKGROUND OF THE INVENTION

1. Field of the Invention

The present invention pertains to the field of television signal processing. More particularly, this invention relates to automatically supporting different oversampling ratios for vertical blanking interval data embedded in television signals.

2. Background

Television transmission signals typically account for a vertical blanking interval (VBI). The VBI refers to the time required by the electron gun in a conventional television set (or similar visual display) to reset itself to the top of the television screen from the bottom of the screen. Conventional television sets and many other visual displays generate their display by using an electron gun(s) to illuminate each line on the television screen. The electron gun illuminates a single line at a time and typically starts at the top of the screen, illuminates every other line as it travels down the screen, then resets itself to the top of the screen once it reaches the bottom. During this reset from the bottom of the screen to the top of the screen, no lines of the screen are being illuminated. This period of reset is referred to as the VBI.

During the VBI, no video information is transmitted by a broadcasting device because the electron gun is not illuminating lines at that time. Thus, control information and/or other data can be transmitted during the VBI rather than video information without disrupting the video and/or audio transmission. Typically, a portion of the VBI is used by television broadcasters for control information necessary for displaying the video information. This control information includes, for example, video synchronization signals. In addition, a portion of the VBI is typically reserved for broadcasting the text for closed captioning for the hearing impaired. However, unused space remains in the VBI which can be used by a broadcaster to broadcast any of a wide variety of data, typically referred to as teletext data, of the broadcaster's choosing.

Digitizing hardware for capturing teletext data typically samples each teletext scan line with a particular oversampling ratio. The oversampling ratio specifies the ratio of the capture hardware's A/D sampling frequency to the teletext's data bit frequency. For example, if the capture hardware's A/D sampling frequency is 28.636 Mhz, and the teletext's frequency is in accordance with the North American Broadcasting Television Specification (NABTS), that is, 5.7272 Mhz, the oversampling ratio is 5.

The oversampling ratio used by different hardware capture devices can vary. However, the decoder needs to know the oversampling ratio used by the hardware capture device it is receiving data from in order to properly decode the data. Therefore, given the variety of commercially available capture devices, it would be beneficial to have a single decoder which would automatically support different oversampling ratios.

Additionally, situations can arise where the oversampling ratio changes due to different standards. By way of example, different countries can use different standards for transferring teletext data, which can result in different oversampling ratios due to different data bit modulation frequencies. Thus, it would be advantageous to provide a way to support continuously changing oversampling ratios.

One solution to this problem is to provide different customized software code for each of the possible oversampling ratios. However, providing such customized code for each possibility is impractical because the number of possibilities is too large. Thus, it would be beneficial to provide a mechanism to automatically adjust to different oversampling ratios without requiring specific customized code for each possibility.

As will be described in more detail below, the present invention provides a method and apparatus for supporting variable oversampling ratios when decoding vertical blanking interval data to achieve these and other desired results which will be apparent to those skilled in the art from the description that follows.

SUMMARY OF THE INVENTION

A method and apparatus for supporting variable oversampling ratios when decoding vertical blanking interval data is described herein. The present invention receives an indication of an oversampling ratio being used to sample a signal received during the vertical blanking interval and also receives the sampled signal. The present invention then identifies the data embedded in the vertical blanking interval based on the indication of the oversampling ratio.

According to one embodiment, the present invention can receive indications of different oversampling ratios being used by a data capture device. Upon receipt of an indication of a new oversampling ratio, the present invention proceeds to identify the data embedded in the vertical blanking interval based on the indication of the new oversampling ratio.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a hardware system, such as a computer system, or similar electronic computing device, that manipulates and transforms data represented as physical (electronic) quantities within the hardware system's registers and memories into other data similarly represented as physical quantities within the hardware system memories or registers or other such information storage, transmission or display devices.

Various operations will be described as multiple discrete steps in turn in a manner that is most helpful in understanding the present invention, however, the order of description should not be construed as to imply that these operations are necessarily order dependent, in particular, on the order of presentation.

Figure 1:
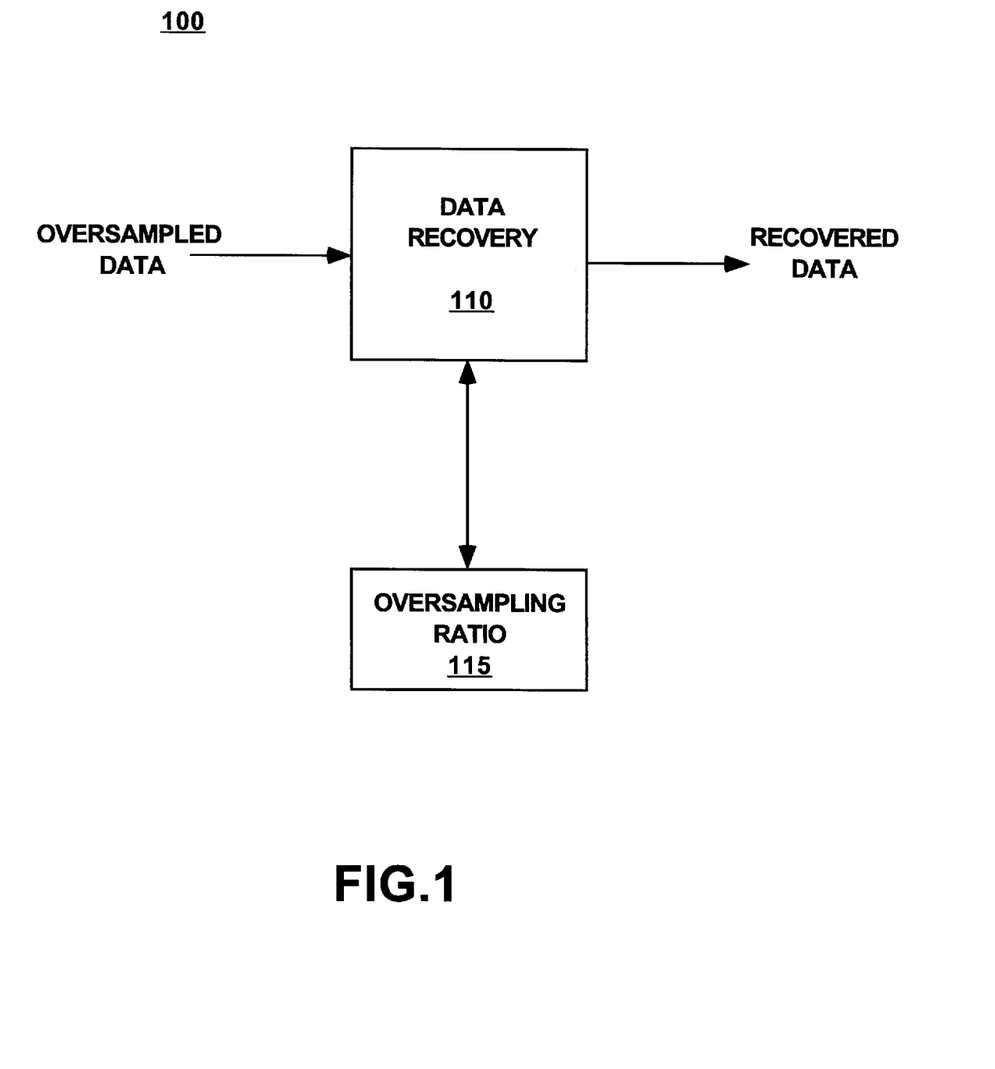
FIG. 1 is a block diagram illustrating an overview of one embodiment of the present invention.

FIG. 1 is a block diagram illustrating an overview of one embodiment of the present invention. FIG. 1 shows an oversampling process 100 including a data recovery module 110 and an oversampling ratio 115. Data is received in the form of an analog waveform by a capture device (not shown) during a vertical blanking interval (VBI) from a North American Basic Teletext Specification (NABTS) signal, (see the Joint EIA/CVCC Recommended Practice for Teletext: North American Basic Teletext Specification (NABTS), EIA-516, May 1988). The analog waveform is sampled by the capture device, using oversampling, and the oversampled data is transferred from the capture device to data recovery process 110, which outputs a single-bit representation of each bit of the oversampled data. Oversampling ratio 115 is a value which is received from the capture device indicating the oversampling ratio used by the capture device. Data recovery module 110 uses oversampling ratio 115 for the recovery process, as discussed in more detail below.

Figure 2A:
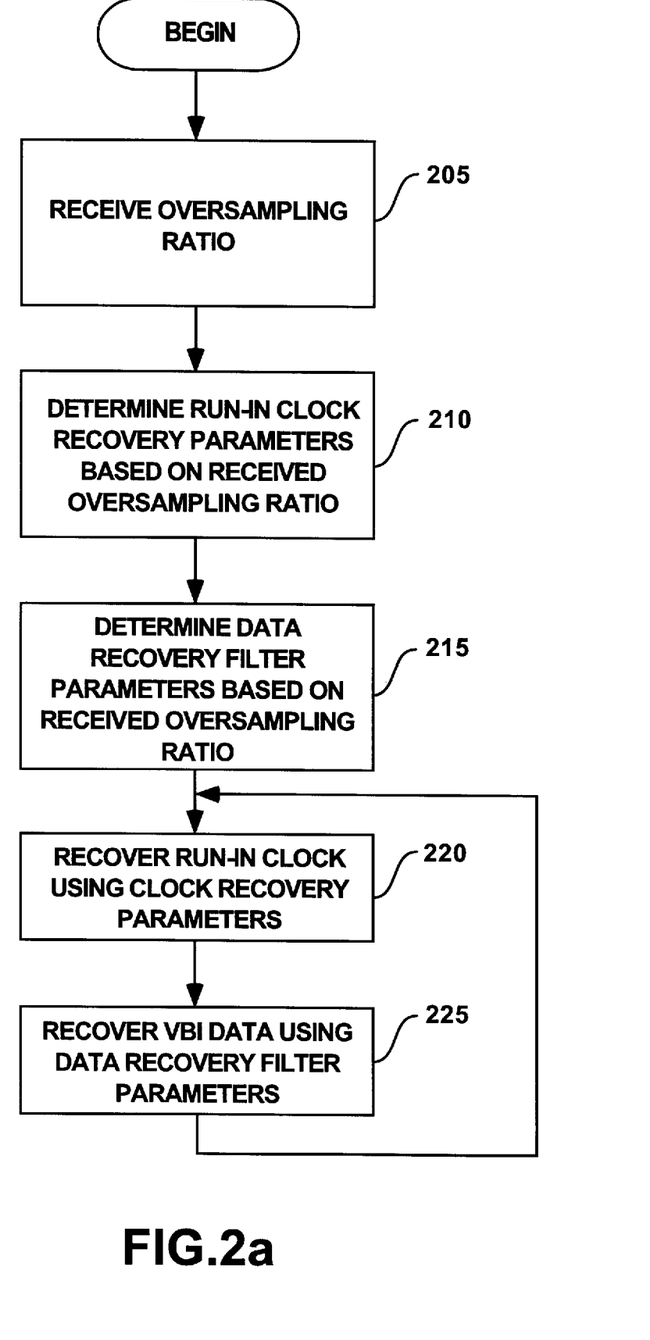
FIG. 2a is a flowchart illustrating the steps followed by the data recovery process according to one embodiment of the present invention.

FIG. 2a is a flowchart illustrating the steps followed by the data recovery process according to one embodiment of the present invention. The data recovery process first receives an oversampling ratio from the capture device, step 205. The format of the oversampling ratio in the illustrated embodiment is a combined integer and remainder value with the eight most significant bits of a 32-bit value specifying the oversample integer and the 24 least significant bits of the 32-bit value specifying the oversample remainder. Typical oversampling ratios are in the range of 2 to 8. However, it is to be appreciated that any of a wide range of oversampling ratios can be used with the present invention, balancing computational efficiency versus sufficient oversampling for accurate identification of the data embedded in the VBI.

The data recovery process then determines the run-in clock recovery parameters based on the oversampling ratio received in step 205, step 210. The run-in clock is used by the data recovery process to synchronize itself to the data embedded in the vertical blanking interval by the broadcaster.

Given that different oversampling rates will result in different numbers of samples between two peaks of the run-in clock, data recovery process 110 uses a normalization factor to normalize the samples to the oversampling rate. In one embodiment, this normalization factor is a clock recovery parameter discussed above. The normalization factor normalizes the "vertical" sampling value differences between two neighboring sample points to an expression of a linear approximation of the phase error between the sample points and a NABTS data bit center. This phase expression is normalized again based on the NABTS signal amplitudes and is then combined with an expression based on the "horizontal" distance between an actual sample point and the expected bit center in order to calculate an overall phase error for purposes of run-in clock phase detection as described below.

Figure 2B:
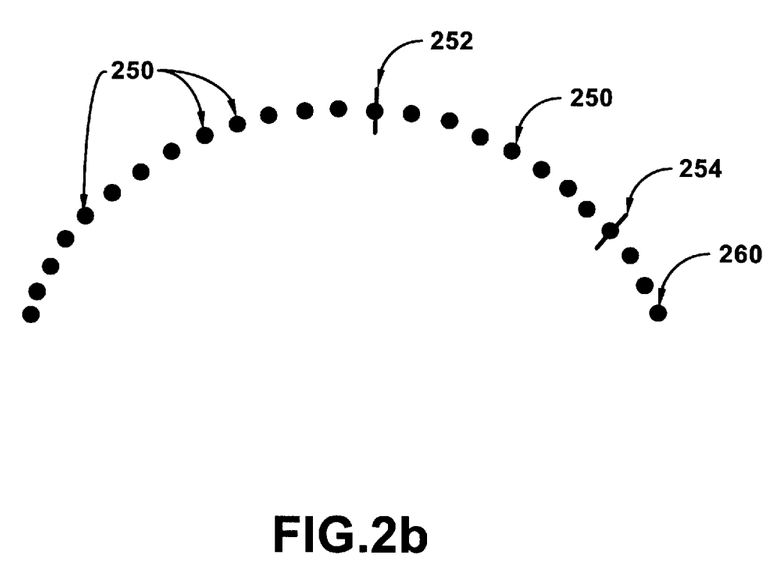
FIG. 2b illustrates a method for calculating a normalization factor according to one embodiment of the present invention.

The method for calculating the normalization factor according to one embodiment of the present invention is illustrated in FIG. 2b. FIG. 2b illustrates multiple subdivision points 250, each of which represents one subdivision between sampling points of a hypothetical analog signal 260. In the illustrated embodiment, the signal between each sample point is subdivided into eight portions. Two neighboring sample points 252 and 254 are shown in FIG. 2b. Sample point 252 corresponds to the peak of the cycle of the VBI line. For calculating the normalization factor, the value of this peak is taken to be one, corresponding to the radius of a unit circle. Data recovery process 110 first calculates the vertical difference between the sample points 252 and 254. This difference is determined by calculating the difference between the cosine of the sample point 302, which is one, and the cosine of pi divided by the oversampling ratio.

Then, the vertical difference is divided into the value of eight. Eight is used as the dividend because it equals two times four, with two compensating for the amplitude of the half cycle and four compensating for the offset of sampling point 252 by four subdivisions. The sampling point 252 is considered to be offset by four subdivisions because it is offset by four subdivisions from where it would be if the analog peak were centered between the two sampling points 252 and 254. The resulting quotient is then multiplied by 64 k ($2^{16}$) in order to generate a normalization factor of the same precision as the expression of the phase difference based on expected versus actual sample points as described below.

It is to be appreciated that data recovery process 110 could use other processes to generate the normalization factor. By way of example, different linear approximations could be used rather than the approximation in FIG. 2b which presumes that the sample point 252 is at the peak of the hypothetical cycle.

In one embodiment, the normalization factors for multiple expected oversampling ratios are pre-calculated by the data recovery process and stored in, for example, a table or other data structure. In one implementation this pre-calculated table includes 64 oversampling ratios and corresponding normalization factors, ranging from an oversampling ratio of 2 to an oversampling ratio 128. The data recovery process 110 then uses the normalization factor corresponding to an oversampling ratio in the table which is closest to the actual oversampling ratio being used by the capture device. In an alternate embodiment, the normalization factor for the oversampling ratio received in step 205 is calculated upon receipt of the oversampling ratio from the capture device.

The data recovery process also determines filter parameters for the data recovery based on the oversampling ratio received in step 205, step 215. These filter parameters are used by the data recovery process to more accurately identify the data embedded in the vertical blanking interval, as discussed in more detail below. The filter parameters are used because typically there is not a peak of the analog signal at the sampling point for a bit of VBI data. However, for improved anti-ghosting filtering, the peak should be reconstructed as accurately as possible, thus requiring the filters.

According to one embodiment of the present invention, the filter parameters are multiple sets of four coefficients each. Each of the four coefficients will be applied to one sample of the oversampled data received from the capture device, as discussed in more detail below.

According to one embodiment of the present invention, data recovery process 110 calculates the sets of four coefficients as follows. Data recovery process 110 generates eight sets of coefficients for each of multiple classifications of waveforms. Each of the eight sets corresponds to a different phase offset between a sampling point and a bit center of the received analog waveform. This phase is in terms of the sampling points, where 360° represents the phase between two sampling points. The total possible offset, 360°, is divided by eight to generate each offset. Thus, in this embodiment, each offset is 45°.

In identifying the value of a VBI bit, the data recovery process separates the four samples into two sets of two samples each and determines which of the following classifications the waveform represented by these two sets of samples falls within: flat/flat, cosine/cosine, flat/cosine, and cosine/flat. The "flat" refers to an approximately horizontal input waveform over the two samples in the set, and the "cosine" refers to an approximately cosine waveform over the two samples in the set. Two neighboring NABTS bits of approximately equal value yield a flat half waveform, and two bits of significantly different value yield a cosine half waveform. The identification of which of these classifications a waveform falls in is discussed in more detail below.

Estimate filters and peak reconstruction filters for each of the four classifications are generated for each of the eight possible phase offsets. As discussed in more detail below, the estimate filters are used by the data recovery process to estimate whether a particular portion of the input waveform is closer to a flat waveform or a cosine waveform, and the peak reconstruction filters are used by the data recovery process to more accurately identify the data bit value of the particular portion. The values of the cosines of the angles of the various sample subdivisions relative to the data bit peaks are used in both the cosine estimate filter as well as the peak reconstruction filters. These angles are in terms of the VBI data bit period in which each bit period equals pi radians. Thus, in one embodiment, the cosines (in radians) for each of the sample subdivisions is first calculated.

In the illustrated embodiment, the flat estimate filter is generated by defining all four coefficients for each of the eight possible phase offsets to be 8. The cosine estimate filter is generated by separating the four samples into two halves, each including two samples. For each half, the ratio of the cosines of the two samples is calculated to determine a slope of the waveform. This ratio is then used to scale both cosines to generate a sum of sixteen for the magnitudes of the coefficients for the estimate filter. According to one embodiment, the following calculations are performed for each half, where the inside sample refers to the one sample of the two which is closest to the data bit peak and the outside sample refers to the one sample of the two which is farthest from the data bit peak. If the cosine of the outside sample, cos(outside), and the cosine of the inside sample, cos(inside), are both positive, and if cos(inside) is less than cos(outside), then the coefficient for the outside sample equals 16 divided by the ratio of ((cos(inside)/cos(outside))+1), and the coefficient of the inside sample equals 16 minus the coefficient of the outside sample. However, if cos(outside) is less than or equal to cos(inside), then the coefficient for the inside sample equals 16 divided by the ratio of ((cos(outside)/cos(inside))+1), and the coefficient of the outside sample equals 16 minus the coefficient of the inside sample. If cos(outside) is negative, and if cos(inside) is less than −cos(outside), then the coefficient for the outside sample equals −16 divided by the ratio of ((cos(inside)/−cos(outside))+1), and the coefficient for the inside sample equals 16 plus the coefficient of the outside sample. However, if −cos(outside) is less than or equal to cos(inside), then the coefficient for the inside sample equals 16 divided by the ratio of ((−cos(outside)/cos(inside))+1), and the coefficient for the outside sample equals the coefficient of the inside sample minus 16.

The peak reconstruction filters are generated by attempting to normalize the values of a perfect waveform (either cosine/cosine, flat/cosine, cosine/flat, or flat/flat, depending on the filter). In one embodiment, this is accomplished in the following manner. For each of the eight phase offsets, and for each waveform, the squares of the values of each of the four samples are summed together. For a flat waveform or half-waveform, the value is one. For a cosine waveform or half-waveform, the value is the cosine of the angle between the sample point and the VBI data bit center in terms of the VBI data bit period. This sum of squares is then divided into 32 to generate the peak reconstruction normalization factor for that waveform at that phase offset. Then, for each sample, this peak reconstruction normalization factor is multiplied by the value of the sample to generate the coefficient.

Table I illustrates example coefficients calculated for the estimate and peak reconstruction filters for a 4⅔ oversampling ratio according to one embodiment of the present invention.

TABLE I

| Off-set | Cosine Estimate Coeff. | | | | Flat Estimate Coeff. | | | | Cosine/Cosine Reconst. Coeff. | | | | Flat/Cosine Reconst. Coeff. | | | | Cosine/Flat Reconst. Coeff. | | | | Flat/Flat Reconst. Coeff. | | | |
|---|---|---|---|---|---|---|---|---|---|---|---|---|---|---|---|---|---|---|---|---|---|---|---|---|
| 0 | 7 | 9 | 14 | 2 | 8 | 8 | 8 | 8 | 11 | 15 | 11 | 2 | 12 | 12 | 9 | 1 | 7 | 9 | 9 | 9 | 8 | 8 | 8 | 8 |
| 1 | 6 | 10 | 13 | 3 | 8 | 8 | 8 | 8 | 10 | 15 | 12 | 3 | 12 | 12 | 10 | 2 | 6 | 9 | 9 | 9 | 8 | 8 | 8 | 8 |
| 2 | 6 | 10 | 12 | 4 | 8 | 8 | 8 | 8 | 9 | 15 | 13 | 4 | 11 | 11 | 10 | 3 | 6 | 9 | 10 | 10 | 8 | 8 | 8 | 8 |
| 3 | 6 | 10 | 11 | 5 | 8 | 8 | 8 | 8 | 8 | 14 | 13 | 6 | 11 | 11 | 10 | 4 | 5 | 10 | 10 | 10 | 8 | 8 | 8 | 8 |
| 4 | 5 | 11 | 11 | 5 | 8 | 8 | 8 | 8 | 7 | 14 | 14 | 7 | 10 | 10 | 10 | 5 | 5 | 10 | 10 | 10 | 8 | 8 | 8 | 8 |
| 5 | 5 | 11 | 10 | 6 | 8 | 8 | 8 | 8 | 6 | 13 | 14 | 8 | 10 | 10 | 10 | 5 | 4 | 10 | 11 | 11 | 8 | 8 | 8 | 8 |
| 6 | 4 | 12 | 10 | 6 | 8 | 8 | 8 | 8 | 4 | 13 | 15 | 9 | 10 | 10 | 9 | 6 | 3 | 10 | 11 | 11 | 8 | 8 | 8 | 8 |
| 7 | 3 | 13 | 10 | 6 | 8 | 8 | 8 | 8 | 3 | 12 | 15 | 10 | 9 | 9 | 9 | 6 | 2 | 10 | 12 | 12 | 8 | 8 | 8 | 8 |

In one embodiment of the present invention, the filter parameters calculated in step 215 are pre-calculated by data recovery process 110 for multiple expected oversampling ratios and stored in, for example, a table or other data structure. In one implementation this pre-calculated table includes 64 oversampling ratios and corresponding sets of filter parameters, ranging from an oversampling ratio of 2 to an oversampling ratio of 128. Data recovery process 110 uses the filter parameters corresponding to an oversampling ratio in the table which is closest to the actual oversampling ratio being used by the capture device. In an alternate embodiment, the filter parameters for the oversampling ratio received in step 205 are calculated upon receipt of the oversampling ratio from the capture device.

The data recovery process then recovers the run-in clock from a line of the vertical blanking interval using the clock recovery parameters determined in step 210, step 220. Upon recovering the run-in clock, the data recovery process then recovers the data from the line of the vertical blanking interval using the data recovery filter parameters determined in step 215, step 225.

In the illustrated embodiment, the data recovery process continues to recover the run-in clock and VBI data for subsequent VBI lines, repeating steps 220 and 225 for each new VBI line. This repetition continues until the data recovery process receives a signal from the capture device alerting the data recovery process to a new oversampling ratio. Upon receipt of this signal, the data recovery process returns to step 205 to receive the new oversampling ratio and determine new run-in clock recovery parameters and data recovery filter parameters based on the new oversampling ratio, steps 210 and 215, and proceeds to recover data from subsequent lines of the vertical blanking intervals using the new parameters, steps 220 and 225.

Alternatively, rather than waiting for a signal from the capture device, the data recovery process could periodically check whether a new oversampling ratio has been received from the capture device. If a new oversampling ratio has not been received, then the data recovery process continues to recover data from lines of the vertical blanking intervals, steps 220 and 225, until a new oversampling ratio is received. However, if a new oversampling ratio has been received, then the data recovery process determines new run-in clock recovery parameters and data recovery filter parameters based on the new oversampling ratio, steps 210 and 215, and proceeds to recover data from subsequent lines of the vertical blanking intervals using the newly determined parameters, steps 220 and 225. It is to be appreciated that the step of checking whether a new oversampling ratio has been received from the capture device can be performed at any of a wide range of intervals. By way of example, the data recovery process could perform the checking step after each line of vertical blanking data has been recovered, at the end of each vertical blanking interval, after a predetermined number of seconds, etc.

In the discussions to follow, reference is made to particular values in terms of VBI data bits. It is to be appreciated that the number of samples of the VBI line which corresponds to a particular number of VBI data bits, for example 1.5 VBI data bits, is dependent on the oversampling ratio being used. Thus, particular values represented in terms of a number of VBI data bits are calculated each time the oversampling ratio changes in order to identify the number of samples corresponding to the particular number. In one embodiment, a high-precision representation of the number of samples per VBI data bit is expressed by concatenating the integer portion of the oversampling ratio and the eight most significant bits of the 24-bit remainder portion of the oversampling ratio.

Figure 3:
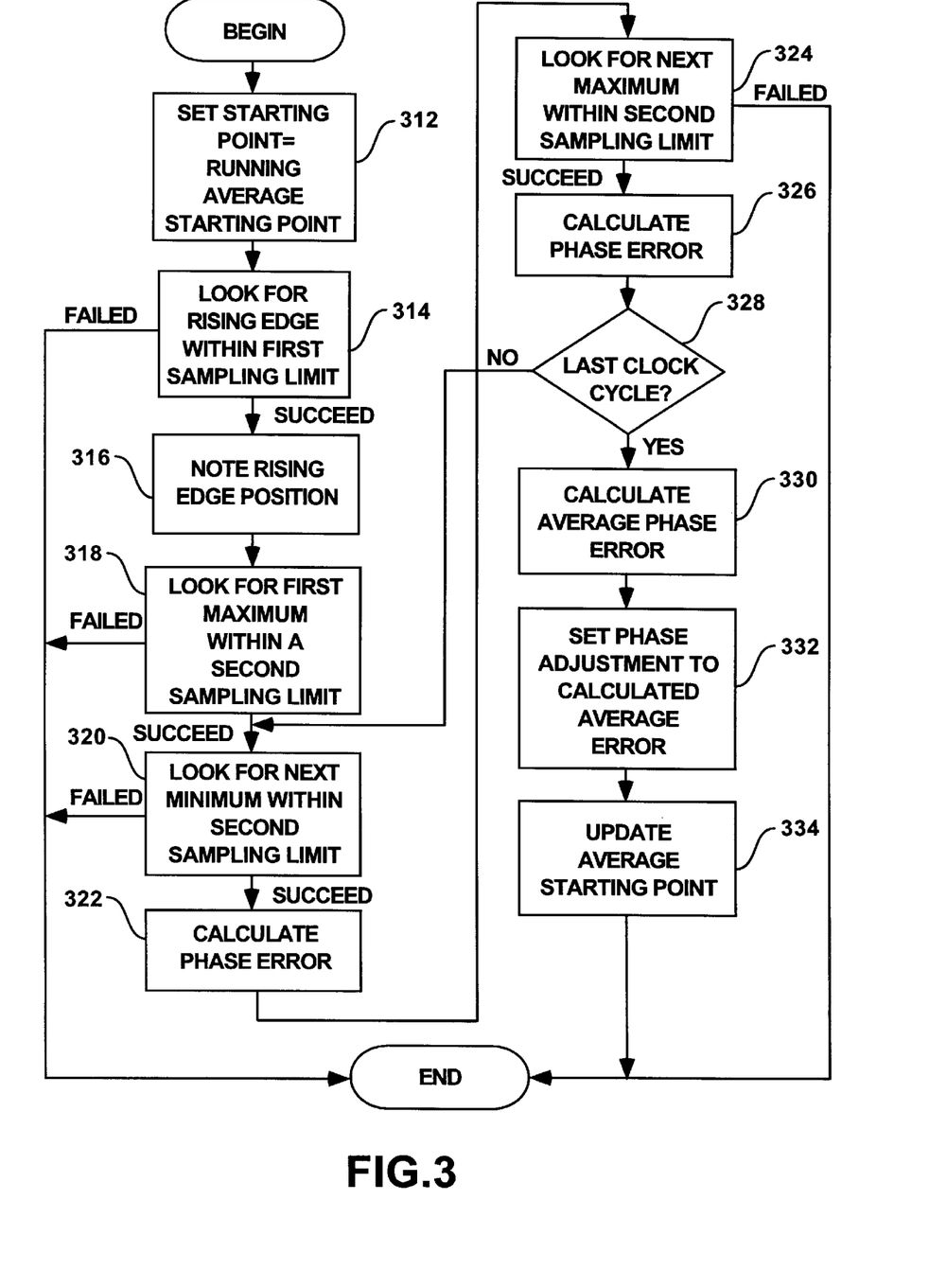
FIG. 3 is a flowchart illustrating the steps followed by the data recovery process in recovering the run-in clock according to one embodiment of the present invention.

Referring now to FIG. 3, one embodiment of the run-in clock recovery process is illustrated. In one implementation, FIG. 3 illustrates step 220 of FIG. 2a in more detail. As shown in FIG. 3, for the illustrated embodiment, upon invocation data recovery process 110 sets the starting point for analyzing the run-in clock to an average starting position maintained by data recovery process 110, step 312. For the illustrated embodiment, the average starting point is set to the beginning of captured data for a scan line at initialization or reset.

In one embodiment, data recovery process 110 further applies a safety threshold to the starting position to account for timing jitter from scan line to scan line or field to field, e.g. by subtracting a predetermined quantity from the current average starting position of the run-in clock. In one implementation, this predetermined quantity is 1.5 VBI data bits. In one embodiment, separate average starting points are maintained for different scan lines, e.g. on a scan line by scan line basis, or on a scan line group by scan line group basis, to more accurately optimize the start points when different lines have different modulation sources or different types of modulation.

Having established the starting point, data recovery process 110 looks for the first rising edge, step 314. If the first rising edge is found within a first sampling limit, data recovery process 110 continues with step 316, otherwise, data recovery process 110 rejects the scan line. At step 316, data recovery process 110 notes the position where the first rising edge was detected for the current scan line. In one embodiment the first sampling limit equals 25 VBI data bits Having located the first rising edge, data recovery process 110 looks for the first maximum, step 318. Similarly, if the first maximum is found within a second sample limit, data recovery process 110 continues with step 320, otherwise, data recovery process 110 rejects the scan line. In one embodiment, the second sampling limit equals 1.5 VBI data bits.

Once the first maximum is located, data recovery process 110 looks for the maximum and minimum for all successive clock cycles, steps 320 through 328. It is to be appreciated that the clock cycles should be separated by two VBI data bits. Similarly, for each maximum/minimum search, step 320 or 324, if the maximum/minimum is found within the second sample limit, data recovery process 110 continues, otherwise, data recovery process 110 rejects the scan line. Starting with the first minimum, each time a minimum is found, data recovery process 110 determines the phase error, step 322. Likewise, starting with the second maximum, each time a maximum is found, data recovery process 110 determines the phase error, step 326. Data recovery process 110 continues this process, until the last clock cycle has been located, step 328. In one embodiment, designed to support NABTS compliant teletext scan lines, the last clock cycle is the eighth clock cycle.

For each minimum and maximum in the run-in clock, the phase error is calculated using a combination of two methods. Both methods use the detection of a maximum or minimum. In one embodiment, a maximum is detected where the value of the sample is equal to or less than the value of the closest preceding sample, and a minimum is detected where the value of the sample is equal to or greater than the value of the closest preceding sample.

The first method is to determine the difference between the sample position at which the minimum or maximum is detected and the predicted sample position at which the minimum or maximum would be expected based on the oversampling ratio. In one embodiment, the minimum or maximum sample position is an integer value while the predicted sample position may be a high precision fractional value indicating a position between actual samples. The position difference value then is a high precision fractional value. The second method is to determine the difference between the value of the sample point at which the minimum/maximum is detected and the value of the closest preceding sample point.

In addition, at each minimum/maximum, the amplitude of the run-in clock signal is calculated by determining the difference between the value of the sample closest to the minimum/maximum and the value of the sample closest to the preceding minimum/maximum. For each minimum or maximum the sample position difference, the sample value difference, and the signal amplitude are accumulated.

After scanning through to the last clock cycle of the run-in clock, an average phase error is calculated for the run-in clock, step 330. The accumulated high precision position value is averaged over the total number of maxima and minima analyzed. The accumulated sample value difference is divided by the accumulated sum of signal amplitudes and then multiplied by a precalculated factor to normalize it to the high precision average position values. It is then added to the average position values. This combined total is then normalized to a lower precision value indicating the average phase error. Data recovery process 110 then sets the phase adjustment to the calculated average phase error, step 332.

Finally, for the illustrated embodiment, data recovery process 110 updates the average starting point for analyzing the run-in clock, step 334, including the most recent position where the first rising edge of the run-in clock is found. In one embodiment, data recovery process 110 further applies another safety threshold to the updated average starting point to prevent the average starting position from drifting too far into the run-in clock, e.g. by limiting the start position to be no greater than a predetermined number of VBI data bits from the beginning of the captured scan line. In one implementation, this predetermined number is 25 VBI data bits.

In one embodiment, data recovery process 110 further periodically scans the pedestal data between the beginning of the captured scan line and the current average start position. If a rising edge is found in this region, the current average start position is set back to the position of that rising edge. A typical period for performing such scanning is 15 to 60 scan lines.

According to one embodiment of the present invention, in order to provide for more noise-tolerant run-in clock recovery, the data recovery process 110 performs additional processing in calculating the average phase error (step 330). This additional processing is described in more detail with reference to FIGS. 4 and 5.

Figure 4:
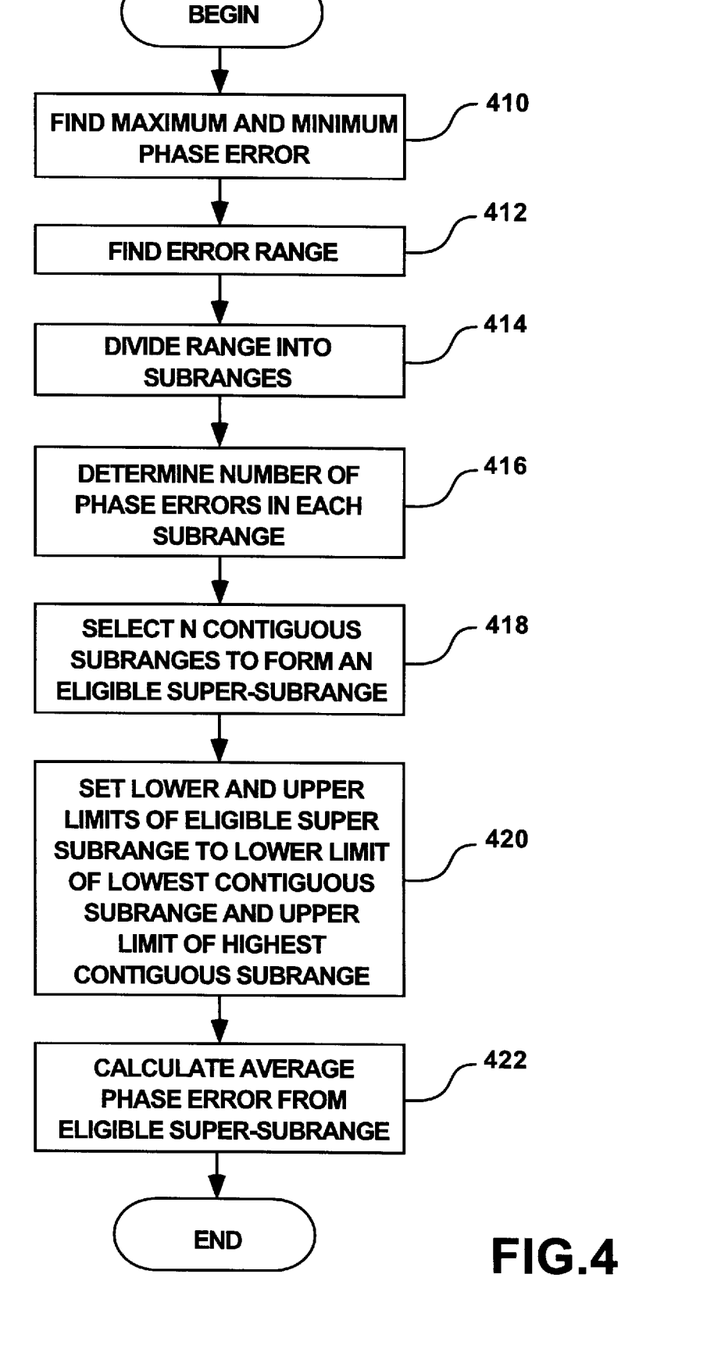
FIGS. 4 and 5 are flowcharts illustrating the steps followed by the data recovery process in providing for more noise-tolerant run-in clock recovery according to one embodiment of the present invention.

As shown in FIG. 4, having computed the phase errors from all maximums and minimums found, data recovery process 110 determines the maximum and minimum phase errors, step 410. Based on the maximum and minimum phase errors, data recovery process 110 computes a phase error range, step 412. Then, data recovery process 110 divides the phase error range into subranges, step 414, and determines the number of phase errors in each subrange, step 416. For the illustrated embodiment, data recovery process 110 divides the phase error range into eight subranges.

Having found the population in each subrange, data recovery process 110 selects N or less contiguous subranges to form an eligible phase error super-subrange, step 418. For the above described NABTS supporting embodiment, N equals three. Having constructed the eligible phase error super-subrange, data recovery process 110 sets the lower and upper phase error limits of the super-subrange to the lower limit of the lowest contiguous subrange and the upper limit of the contiguous subrange respectively, step 420.

Next, data recovery process 110 calculates the average phase error, using only phase errors that fall within the eligible phase error super-subrange, and excluding all other phase errors, step 422, thereby excluding distortions in a few clock cycles due to the presence of noise, improving accuracy, and avoiding unnecessary rejections of scan lines. The sample position difference, sample value difference and signal amplitude discussed above with reference to FIG. 3 are each calculated as discussed above. However, all values are not averaged together as discussed above. Rather, only those values corresponding to the eligible phase error super-subrange are used.

Figure 5:
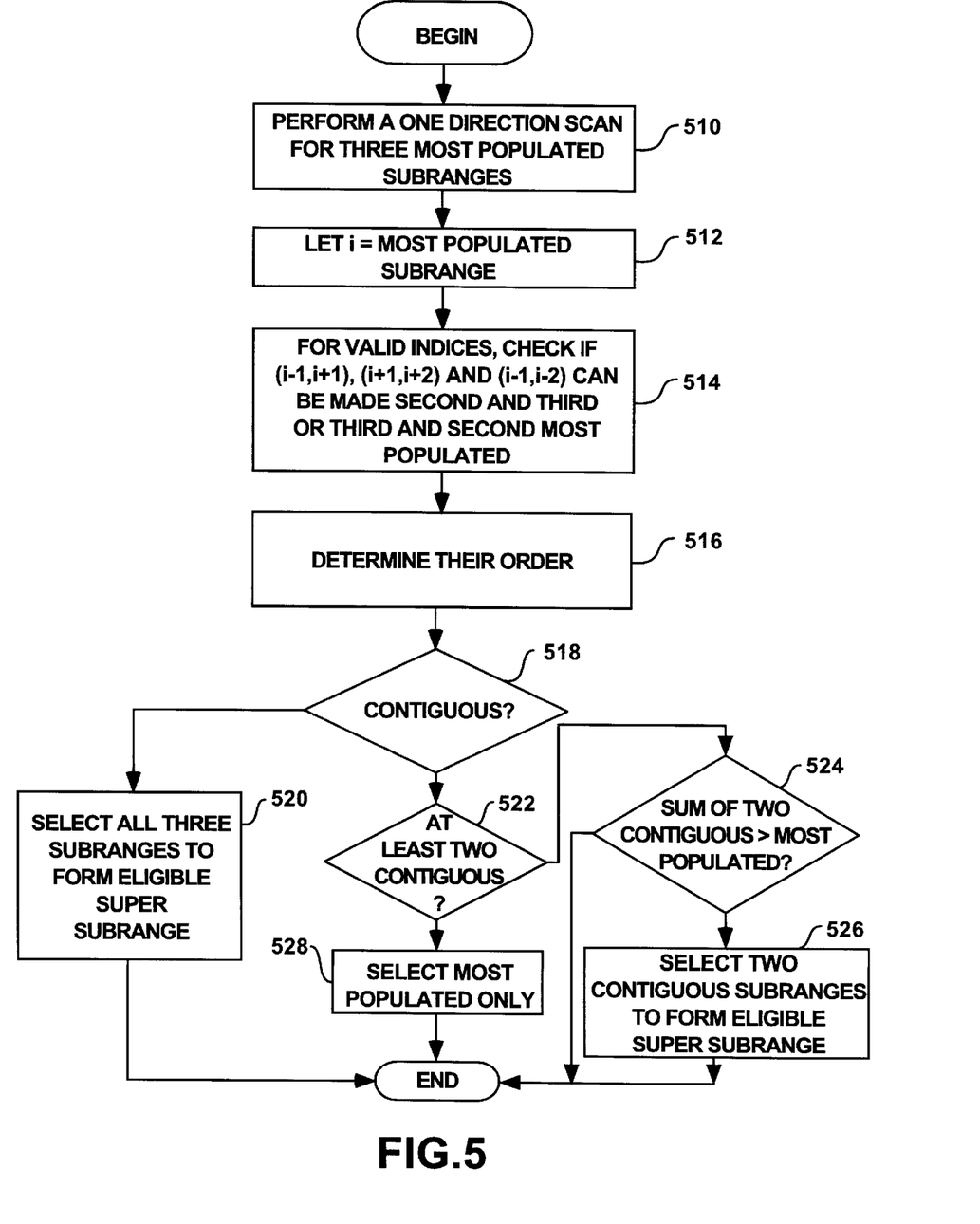

FIG. 5 illustrates one embodiment of step 418 in further detail. As shown, for the illustrated embodiment, data recovery process 110 first performs a one direction scan for three most populated subranges, step 510. Then, data recovery process 110 determines if the subranges adjacent to the most populated subrange can be substituted as the second and/or third most populated subranges, steps 512 and 514. The reason this "swapping" may be necessary is because subranges adjacent to the most populated subrange may not have been considered as the second or third most populated subrange, because their population was merely equal to but not greater than a subrange earlier considered to be the second or third subrange. For example, if the one direction scan was from subrange 0 to subrange 7, subrange 1 has three phase error observations falling within its subrange, and subrange 5 is considered to be the most populated subrange by virtue of having four phase error observations falling within its subrange, subrange 6 would not be considered as the second most populated subrange during the one direction scan, even if it also has three phase error observations falling within its subrange, because the population count merely equals but is not greater than the population count of subrange 1. In other words, in steps 512 and 514, if i is the subrange index of the most populated subrange, data recovery process 110 examines if {i−1, i+1}, {i+1, i+2} and {i−1, i−2} can be considered as second and third or third and second most populated subranges for all valid indices (it is to be appreciated that for i=0, i−1 and i−2 are invalid, and likewise for i=7, i+1 and i+2 are invalid.

Having determined the three most populated subranges, data recovery process 110 determines their order, that is, first, second, and third, or, first, third and second, and so forth, most populated, step 516. Then, data recovery process 110 determines if the three subranges are contiguous, step 518. If they are already contiguous, data recovery process 110 selects all three subranges to form the eligible super-subrange, step 520. On the other hand, if the three subranges are not contiguous, data recovery process 110 determines if at least two of the subranges are contiguous, that is, low and mid subranges or mid and high subranges, step 522. If at least two of the subranges are contiguous, data recovery process 110 further determines if the sum of the populations of the two contiguous subranges is greater than the single non-contiguous subrange, step 524. If the sum is greater, data recovery process 110 selects the two contiguous subranges to form the eligible super-subrange, step 526. Otherwise, data recovery process 110 selects the most populated subrange as the eligible super subrange, step 528.

In one embodiment, the noise-tolerant run-in clock recovery described above is invoked to recover the run-in clock after a VBI scan line has been rejected using a conventional clock recovery approach. As will be appreciated by those skilled in the art, the data recovery process 110 while more accurate will require more processing cycles, thus a hybrid approach may provide the desired improvement in accuracy without incurring significant increase to processing cycle requirement, particularly when noise occurs only intermittently.

Figure 6:
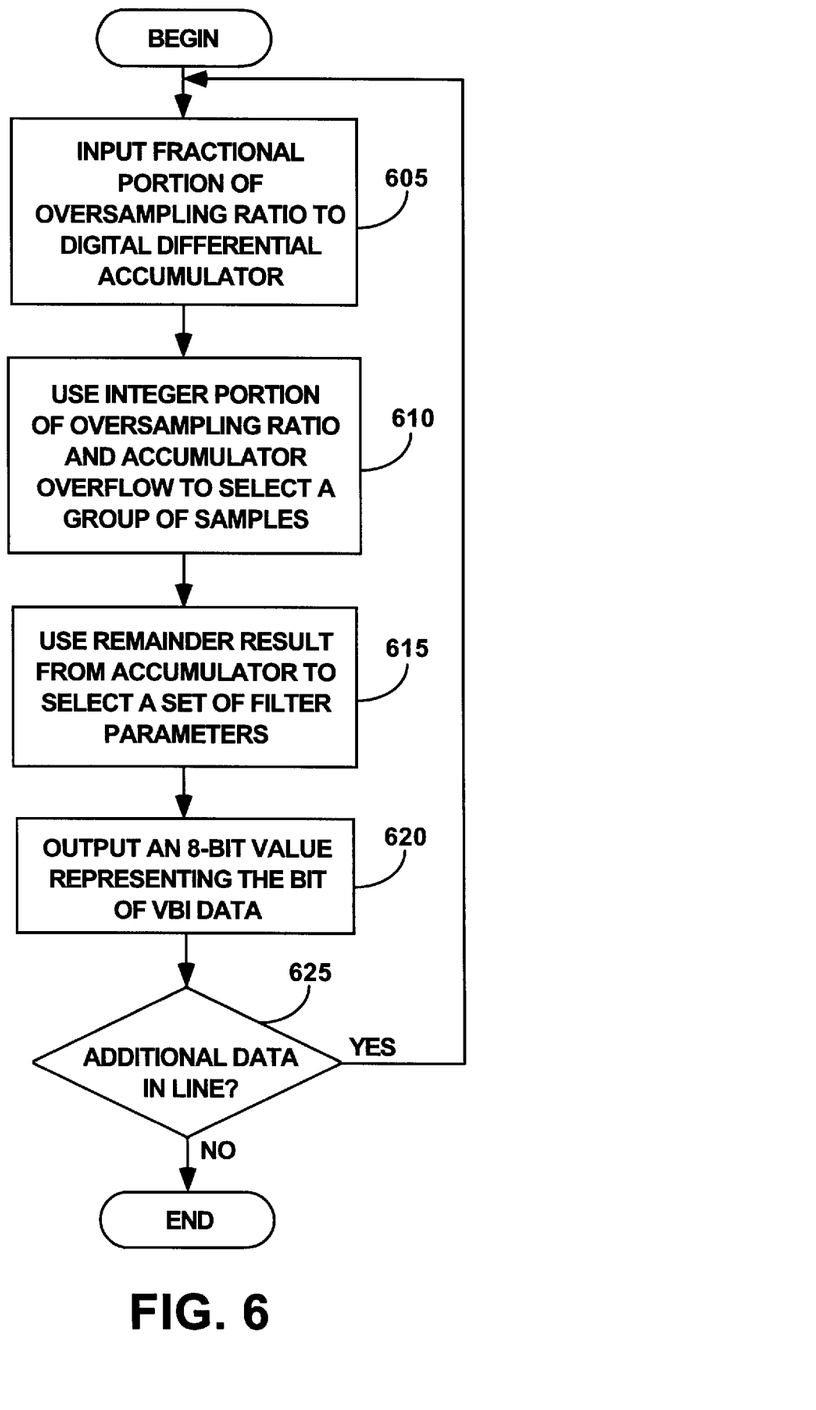
FIG. 6 is a flowchart illustrating the data recovery process according to one embodiment of the present invention.

FIG. 6 is a flowchart illustrating the data recovery process according to one embodiment of the present invention. In one implementation, FIG. 6 illustrates step 225 of FIG. 2a in more detail.

For each bit of VBI data being analyzed, the process of FIG. 6 determines an 8-bit value representing the VBI data bit. The data begins immediately after the run-in clock.

When the data recovery process 110 begins analyzing a scan line for VBI data bits, the fractional portion of the oversampling ratio is input to a digital differential accumulator, step 605. The integer portion of the oversampling ratio is used to select the group of samples which will be used to identify the particular bit, step 610. Then, the remainder result of the accumulator is used to select a particular set of filter parameters of that group, step 615.

Figure 7:
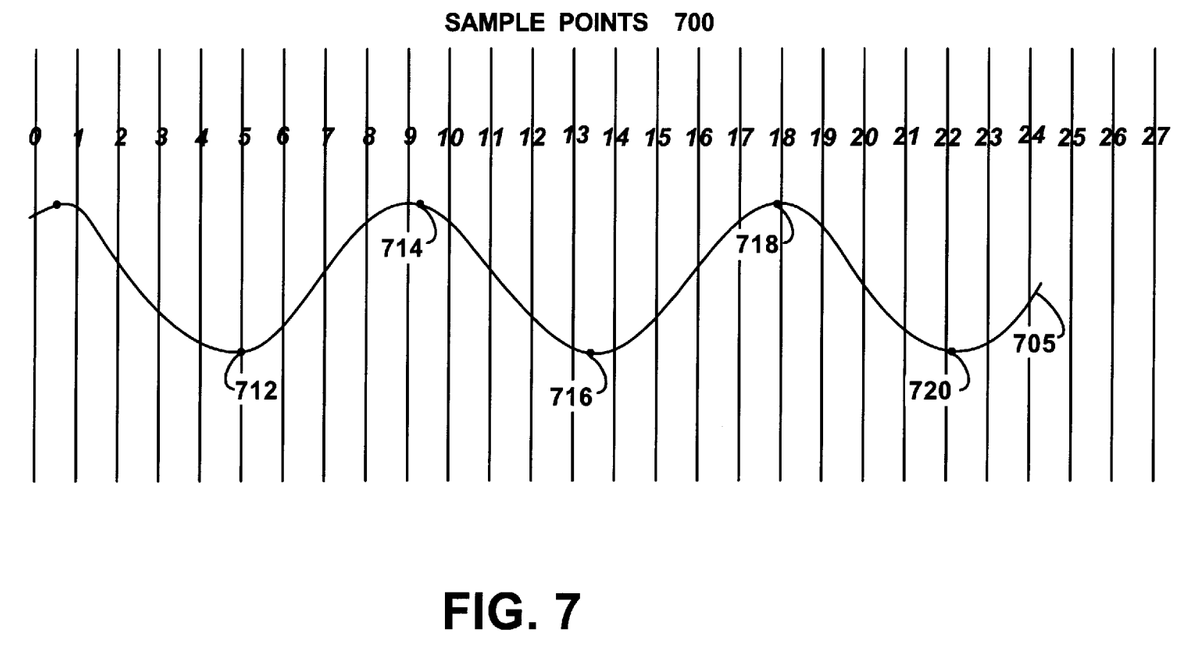
FIG. 7 is a diagram illustrating the use of the digital differential accumulator according to one embodiment of the present invention.

FIG. 7 is a diagram illustrating the use of the digital differential accumulator according to one embodiment of the present invention. In the illustration of FIG. 7, it is assumed that the phase error at the last run-in clock minimum was detected to be zero. In other words, the last run-in clock minimum was directly on a sample point. It is also assumed that the oversampling ratio is 4 2/7, and that the samples are stored in contiguous memory locations. FIG. 7 shows twenty eight sample points 700 of a VBI line 705. VBI line 705 represents a portion of the data received during one scan line of the vertical blanking interval. As illustrated in FIG. 7, each sample point 700 does not necessarily directly line up with the location of a peak for a VBI data bit of line 705. Assuming the last run-in clock minimum was at point 712, then the first VBI data bit is at point 714, which falls between sample point(9) and sample point (10). Assuming an oversampling ratio of 4 2/7, the value of 2/7 is added to the starting value in the accumulator, which is zero at the point of the last minimum of the run-in clock, resulting in a remainder value of 2/7. The value of 4 is added to the memory address where sample point(5) is stored, resulting in the memory address for sample point (9). Thus, the value of the first VBI data bit (at point 714 of line 705) is based on sample point(9) with the value 2/7 identifying the set of filters to be used to identify the first VBI data bit. Then, 2/7 is again added to the accumulator, which provides a remainder of 4/7, and 4 is added to the memory address where sample point(9) is stored, resulting in the memory address for sample point (13). Therefore, the value of the second VBI bit (point 716) is determined by moving ahead four samples to sample point(13) and then selecting the set of filters corresponding to 4/7. Similarly, the value of the third VBI data bit (point 718) is determined by moving ahead four samples to sample point(17) and then selecting the set of filters corresponding to 6/7. Then, when 2/7 is again added to the accumulator, the accumulator overflows, providing an overflow signal and a remainder of 1/7. The overflow signal causes 5, rather than 4, to be added to the memory address where sample point(17) is stored, resulting in the memory address for sample point (22). So, the value of the next VBI data bit (point 720) is determined by moving ahead five samples to sample point (22) and using the set of filters corresponding to 1/7.

FIG. 7 illustrates an approximately sinusoidal analog waveform as VBI line 705. However, those skilled in the art will appreciated that this is merely an example and that the actual shape of the analog waveform of a VBI line is dependent on the data embedded in the VBI line.

In the discussions above with reference to FIG. 2a and Table I, sets of coefficients were identified by dividing the phase between two sampling points by eight. Thus, in order to identify the proper set of filters as discussed in FIG. 7 (in other words, the proper set of coefficients to use), the fractional output of the digital accumulator is identified as corresponding to a particular one of the eight phase offsets. This identification can be done in any of a wide variety of conventional manners. In one embodiment, the fractional output is truncated down to the next one-eighth phase offset. In an alternate embodiment, the fractional output is rounded to either the next higher or lower one-eighth phase offset, whichever is closest.

The set of filter parameters used by data recovery process 110 is dependent on both the shape of the input analog waveform at the sampling point and the phase offset at the sampling point. The phase offset is the remainder result from the digital differential accumulator. The phase offset determines which of the eight sets of filter parameters discussed above with reference to step 215 of FIG. 2a will be used by data recovery process 110. Data recovery process 110 selects four samples relative to the sampling point, including the sample at the sampling point, the preceding sample, and the subsequent two samples. Data recovery process 110 separates the four samples into two sets of two samples each, and classifies the waveform represented by these two sets of samples as flat/flat, cosine/cosine, flat/cosine, or cosine/flat. In one implementation, this classification is identified by applying a cosine-matched filter and a flat-matched filter to each of the two sets. The cosine-matched filter provides higher outputs the closer the input is to a true cosine waveform, and the flat-matched filter provides higher outputs the closer the input is to a true horizontal waveform. Data recovery process 110 compares the outputs of these two matched filters for each set and classifies the set as being flat if the flat-matched filter outputs a higher value than the cosine-matched filter, and classifies the set as being cosine if the cosine-matched filter outputs a higher value than the flat-matched filter.

According to one embodiment of the present invention, the output of the flat-matched filter is increased slightly in order to bias the results towards identifying a flat waveform. In one implementation, the amount of this increase is equal to the output of the flat-matched filter divided by sixteen.

Once the data recovery process 110 determines the proper classification for the four samples, the appropriate peak reconstruction coefficients calculated above with reference to step 215 of FIG. 2a are applied to each of the samples and the sum is generated to provide an 8-bit value representing the decoded bit of VBI data, step 620. It is to be appreciated that only one set of coefficients is applied to the four samples. The data recovery process repeats steps 605 through 620, outputting 8-bit values representing the VBI data until all the data in the VBI line has been decoded, step 625.

The 8-bit values representing the VBI data can then be compared to particular threshold values to determine whether the 8-bit values represent a logical zero or a logical one. Additionally, various filters, such as anti-ghosting filters, can be applied to the 8-bit values to further increase the accuracy of the VBI data recovery.

Figure 8:
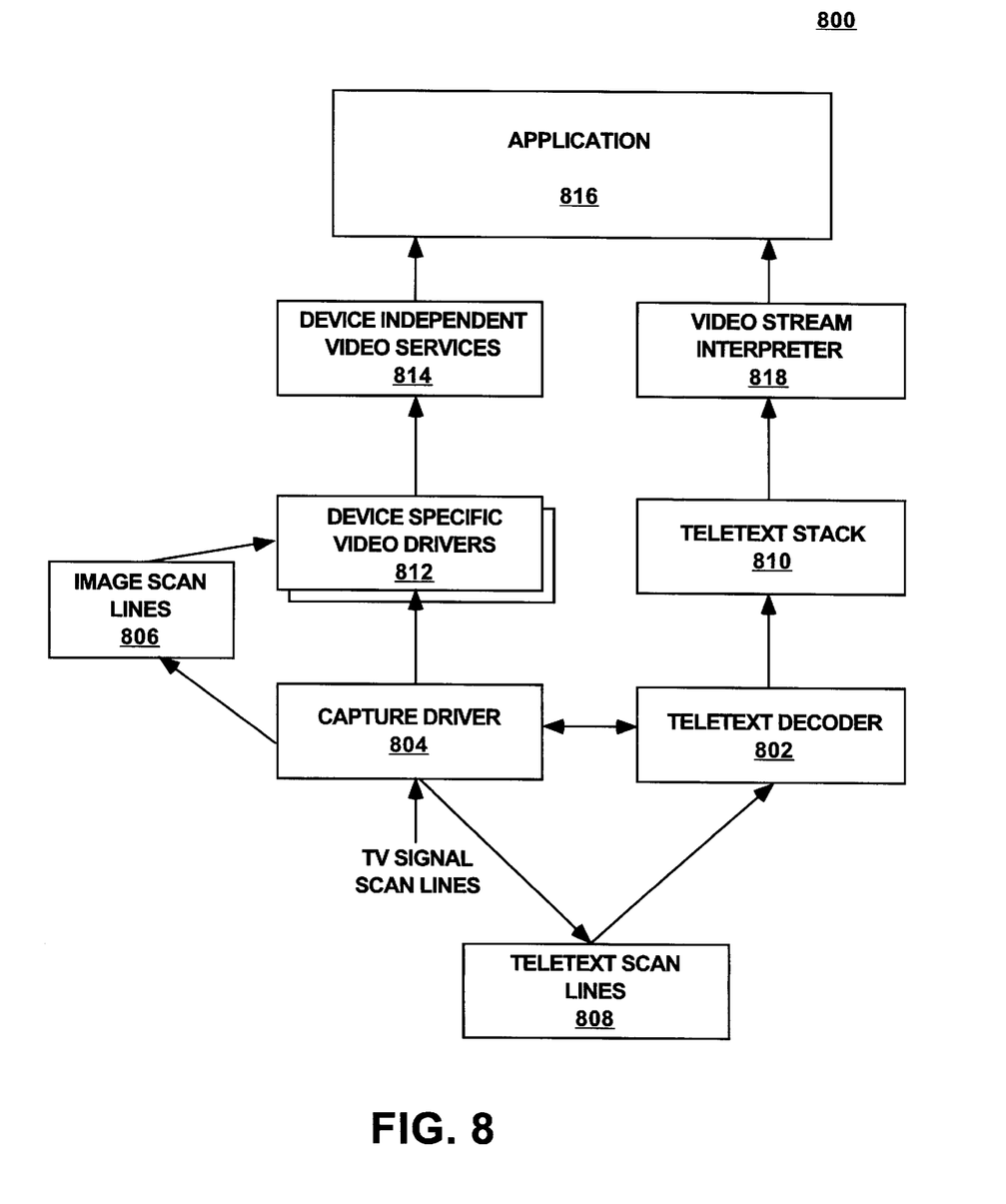
FIG. 8 illustrates one embodiment of a software environment suitable for practicing the present invention.

FIG. 8 illustrates one embodiment of a software environment suitable for practicing the present invention. As illustrated, software embodiment 800 includes common teletext scan line decoder 802 (hereinafter simply common decoder) and capture driver 804, cooperating with each other to generate image scan lines 806, teletext scan lines 808, and teletext stack 810. Common decoder 802 and capture driver 804 are disclosed in copending U.S. patent application No. 08/670,568, entitled, Method And Apparatus For Common Vertical Blanking Interval Scan Line Decoding, invented by the inventor of the present invention.

Additionally, image scan lines 806 are processed by device dependent video drivers 812, for example VfW drivers that implement Microsoft DirectX™ video support, which in turn provides the processed data to a device independent video service 814, such as Microsoft Video for Windows. Device independent video service 814 then generates the television images for video application 816. With respect to the decoded teletext (including closed captions), video stream interpreter 818 interprets the decoded teletext for video application 816.

Figure 9:
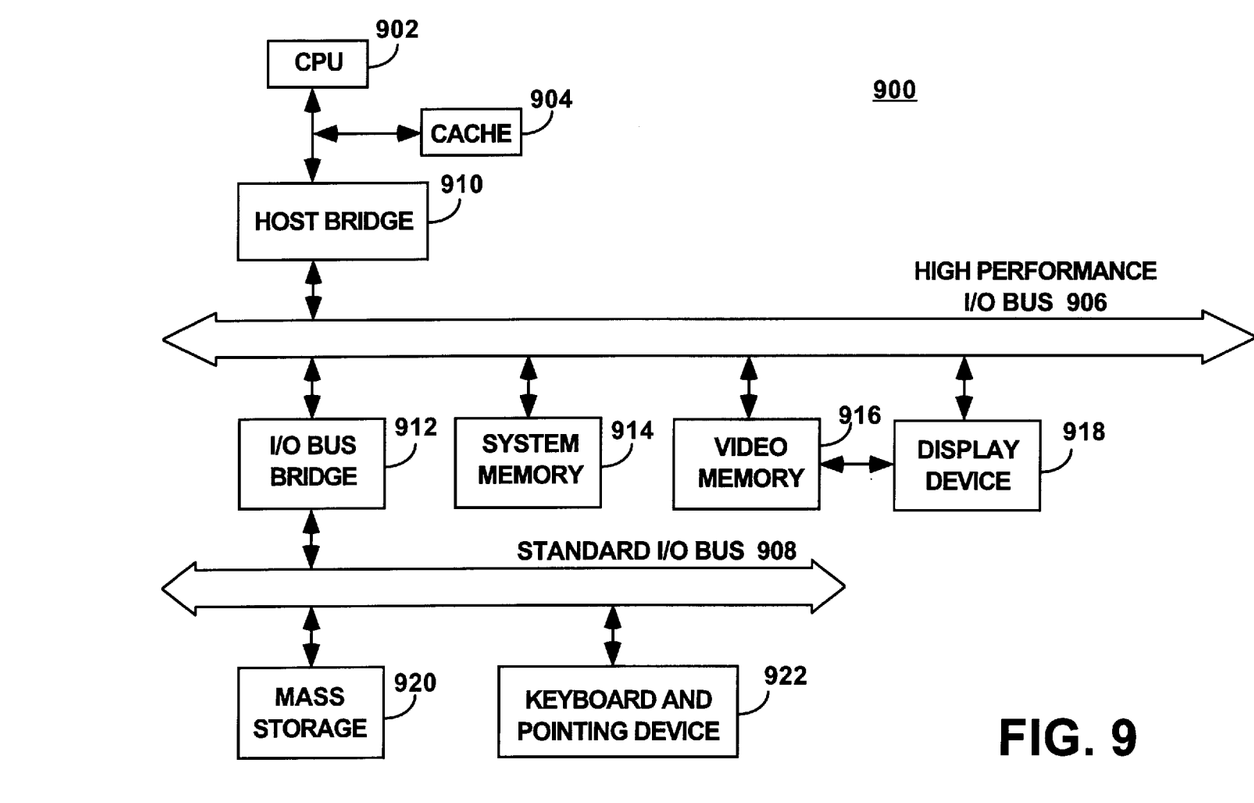
FIG. 9 illustrates one embodiment of a hardware system suitable for programming with the software elements of FIG. 8.

FIG. 9 illustrates one embodiment of a hardware system suitable for programming with the software elements of FIG. 8. As shown, for the illustrated embodiment, hardware system 900 includes CPU 902 and cache memory 904 coupled to each other as illustrated. Additionally, hardware system 900 includes high performance I/O bus 906 and standard I/O bus 908. Host bridge 910 couples CPU 902 to high performance I/O bus 906, whereas I/O bus bridge 912 couples the two buses 906 and 908 to each other. Coupled to bus 906 are system memory 914 and video memory 916. In turn, display device 918 is coupled to video memory 916. Coupled to bus 908 is mass storage 920 and keyboard and pointing device 922.

These elements 902–922 perform their conventional functions known in the art. In particular, mass storage 920 is used to provide permanent storage for the programming instructions implementing the above described functions, whereas system memory 914 is used to provide temporary storage for the programming instructions when executed by CPU 902. Mass storage 920 may be provided with the programming instructions by loading the programming instructions from a distribution storage medium (not shown), or by downloading the programming distributions from a server (not shown) coupled to hardware system 900 via a network/communication interface (not shown). Collectively, these elements are intended to represent a broad category of hardware systems, including but not limited general purpose computer systems based on the Pentium® processor or Pentium® Pro processor, manufactured by Intel Corp. of Santa Clara, Calif.

In the discussions above, the NABTS signal under the National Television Standards Committee (NTSC) is discussed. However, it is to be appreciated that the present invention can be used with any television signal which includes a vertical blanking or similar interval. For example, the present invention could be used with the Phase Alternate Line (PAL) broadcast standard utilized in many European countries.

It is also to be appreciated that although television transmission signals are discussed above, the present invention is equally applicable to other types of transmitted signals which provide a vertical blanking interval or analogous interval.

Thus, the present invention automatically adapts to different oversampling ratios. The present invention receives an indication of the oversampling ratio being used by the capture device and modifies its data recovery process based on this oversampling ratio. The present invention then modifies its data recovery process in the event of any subsequent changes to the oversampling ratio.

In one embodiment, the method and apparatus for supporting variable oversampling ratios discussed above is implemented as a series of software routines run by the hardware system of FIG. 9. These software routines comprise a plurality or series of instructions to be executed by a processor in a hardware system, such as CPU 902 of FIG. 9. Initially, the series of instructions are stored on a storage device, such as mass storage device 920. The instructions are copied from storage device 920 into memory 914 and then accessed and executed by CPU 902. In one implementation, these software routines are written in the C++programming language. It is to be appreciated, however, that these routines may be implemented in any of a wide variety of programming languages. In alternate embodiments, the present invention is implemented in discrete hardware or firmware.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for supporting variable oversampling ratios when decoding vertical blanking interval data has been described.

What is claimed is:

1. A method for supporting variable oversampling ratios for decoding vertical blanking interval data, the method comprising the steps of:

(a) receiving an indication of an oversampling ratio used to sample a signal received during the vertical blanking interval;

(b) receiving the sampled signal; and (c) recovering the data embedded in the vertical blanking interval signal based on the indication of the oversampling ratio.

2. The method of claim 1, wherein the receiving step (a) comprises the step of receiving the indication of the oversampling ratio from vertical blanking interval data capture hardware.

3. The method of claim 1, further comprising the step of repeating steps (b) and (c) using a new oversampling ratio in response to receiving an indication of the new oversampling ratio used to sample the signal received during the vertical blanking interval.

4. The method of claim 1, wherein the identifying step (c) comprises the steps of:

recovering a run-in clock signal from the sampled signal based on the indication of the oversampling ratio; and recovering digital data from the sampled signal based on the indication of the oversampling ratio.

5. The method of claim 1, wherein the identifying step (c) further comprises the steps of:

determining one or more run-in clock recovery parameters based on the indication of the oversampling ratio; and recovering a run-in clock signal using at least one of the one or more run-in clock recovery parameters.

6. The method of claim 1, wherein the identifying step (c) further comprises the steps of:

determining a plurality of data recovery filter parameters based on the indication of the oversampling ratio; and recovering the digital data using at least one of the plurality of determined data recovery filter parameters.

7. The method of claim 1, wherein step (c) comprises the step of recovering digital data from the sampled signal based on the indication of the oversampling ratio including, classifying a plurality of samples corresponding to a bit of data to be recovered from the sampled signal; and generating a representation of the bit based on the classifying.

8. The method of claim 7, wherein the classifying comprises identifying whether the samples more closely resemble a flat waveform or a cosine waveform.

9. A computer-readable medium having stored thereon a plurality of instructions for supporting variable oversampling ratios for decoding vertical blanking interval data, the plurality of instructions designed to be executed by a processor, for implementing a function to:

(a) receive an indication of an oversampling ratio used to sample a signal received during the vertical blanking interval;

(b) receive the sampled signal; and (c) identify the data embedded in the vertical blanking interval signal based on the indication of the oversampling ratio.

10. The computer-readable medium of claim 9, the plurality of instructions including instructions for implementing a function to repeat steps (b) and (c) in response to receiving an indication of a new oversampling ratio used to sample the signal received during the vertical blanking interval.

11. The computer-readable medium of claim 9, the plurality of instructions including instructions for implementing a function to:

recover a run-in clock signal from the sampled signal based on the indication of the oversampling ratio; and recover digital data from the sampled signal based on the indication of the oversampling ratio.

12. The computer-readable medium of claim 11, the plurality of instructions including instructions for implementing a function to:

determine one or more run-in clock recovery parameters based on the indication of the oversampling ratio; and recover the run-in clock signal using at least one of the one or more run-in clock recovery parameters.

13. The computer-readable medium of claim 11, the plurality of instructions including instructions for implementing a function to:

determine a plurality of data recovery filter parameters based on the indication of the oversampling ratio; and recover the digital data using at least one of the plurality of data recovery filter parameters.

14. An apparatus comprising:

a memory;

a processor, coupled to the memory, configured to receive an indication of an oversampling ratio used to sample a signal received during a vertical blanking interval, to receive the sampled signal, and to identify the data embedded in the vertical blanking interval signal based on the indication of the oversampling ratio.

15. The apparatus of claim 14, wherein the processor is further configured to repeat the receiving of the sampled signal and the identification of the data embedded in the vertical blanking interval in response to receiving an indication of a new oversampling ratio used to sample the signal received during the vertical blanking interval.

16. The apparatus of claim 14, wherein the processor is further configured to recover a run-in clock signal from the sampled signal based on the indication of the oversampling ratio, and recover digital data from the sampled signal based on the indication of the oversampling ratio.

17. An apparatus for supporting variable oversampling ratios for decoding vertical blanking interval data, the apparatus comprising:

means for receiving an indication of an oversampling ratio used to sample a signal received during the vertical blanking interval;

means for receiving the sampled signal; and means for identifying the data embedded in the vertical blanking interval signal based on the indication of the oversampling ratio.

18. The apparatus of claim 17, wherein the means for identifying comprises:

means for recovering a run-in clock signal from the sampled signal based on the indication of the oversampling ratio; and means for recovering digital data from the sampled signal based on the indication of the oversampling ratio.

* * * * *

UNITED STATES PATENT AND TRADEMARK OFFICE
CERTIFICATE OF CORRECTION

| | | |
|---|---|---|
| PATENT NO. | : 5,812,207 | Page 1 of 1 |
| APPLICATION NO. | : 08/771228 | |
| DATED | : September 22, 1998 | |
| INVENTOR(S) | : Cahill, III | |

It is certified that error appears in the above-identified patent and that said Letters Patent is hereby corrected as shown below:

In column 15, at line 14, delete "identifying" and insert --recovering--.
In column 15, at line 21, delete "identifying" and insert --recovering--.
In column 15, at line 28, delete "identifying" and insert --recovering--.
In column 15, at line 32, delete "digital".

Signed and Sealed this

Eighth Day of August, 2006

JON W. DUDAS
*Director of the United States Patent and Trademark Office*